Feb. 23, 1960   R. HUBER   2,925,708
PISTON OPERATED PRIME MOVERS, MORE PARTICULARLY OF THE
FREE PISTON KIND, COMPRISING AN AUXILIARY GAS TURBINE
ADAPTED TO DRIVE AT LEAST ONE AUXILIARY
DEVICE OF THESE PRIME MOVERS
Filed July 12, 1955
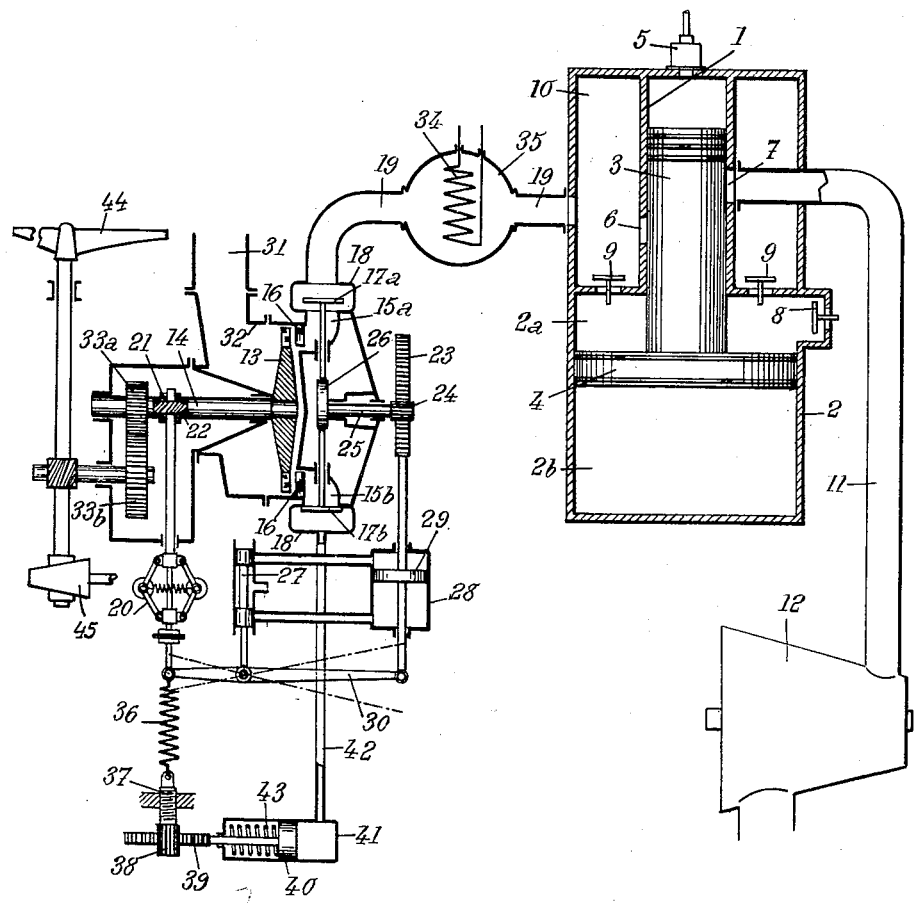
INVENTOR
ROBERT HUBER
BY
Bailey Stephens and Huettig
ATTORNEYS

2,925,708

PISTON OPERATED PRIME MOVERS, MORE PARTICULARLY OF THE FREE PISTON KIND, COMPRISING AN AUXILIARY GAS TURBINE ADAPTED TO DRIVE AT LEAST ONE AUXILIARY DEVICE OF THESE PRIME MOVERS

Robert Huber, Bellevue, France, assignor to Société d'Etudes et de Participations Eau, Gaz, Electricité, Energie, S.A., Geneva, Switzerland, a society of Switzerland Application July 12, 1955, Serial No. 521,470

Claims priority, application France December 28, 1954

2 Claims. (Cl. 60—13)

The invention relates to piston-operated gas-generators comprising an auxiliary gas turbine adapted to drive at least one auxiliary device of the gas-generator, and relates more particularly but not exclusively to gas-generators of this kind having free pistons.

It is known to use an auxiliary gas turbine for driving at least one auxiliary device (such as a water pump, fan or the like) of a piston-type, more particularly free-piston-type, gas-generator.

In known installations the auxiliary turbine is driven by power gases delivered from the power cylinder of the gas-generator, said power gases consisting of a mixture of compressed air and incompletely expanded combustion gas. In known installations of this kind the auxiliary turbine is connected either in series or in parallel with the main receiving engine to be driven by said power gases, which is generally a turbine.

If the auxiliary turbine is connected in series with the main turbine, all the power gases have to pass through the auxiliary turbine.

If the auxiliary turbine is connected in parallel with the main turbine, the auxiliary turbine is supplied with smaller quantities of gases but the pressure thereof still varies in dependence upon the conditions in the main turbine. Now, in many cases, the power of the auxiliary device or devices driven by the auxiliary turbine remains constant or only varies slightly when the power demanded from the main turbine and therefore the power gas pressure vary. The auxiliary turbine therefore has to be designed to operate at minimum gas pressure and its effective nozzle area has to be reduced when the gas pressure is high. This method is particularly disadvantageous in marine power plants where the gas pressure may reach very low values when the vessel is stopped or when the plant is running lightly loaded. Hence, in marine plants of this kind the effective nozzle area of the auxiliary turbine in parallel with the main turbine has to vary from 1 to 100 if the pressure of the power gases above atmospheric pressure drops from 3.2 to 0.1 kg./cm.² The situation is somewhat less unfavorable, but still unsatisfactory, in electricity-producing plants where the maximum speed of the main turbine driven by the power gases delivered by the gas-generator has to be maintained during idle operation. In plants of this kind where the power gas pressure varies, for example, between 3.2 and 0.7 kg./cm.², the ratio between the maximum and minimum values of auxiliary turbine effective nozzle area is 5.5/1.

It is an object of the invention to improve this situation considerably. To this end and according to the main feature of the invention, the auxiliary turbine is supplied, not by gases delivered from the power cylinder of the gas-generator, but by air derived from the air reservoir which is provided in such a generator between the compressor and power units of the gas-generator and which supplies the air to be fed to the power cylinder. The air pressure in this reservoir is relatively high even when the plant is running idly, so that the ratio between the maximum and minimum pressures of this air is less than the ratio between the maximum and minimum pressures of the gases delivered by the power cylinder of the gas-generator. Thus, if the auxiliary turbine is supplied with air derived from said reservoir, the variation in effective nozzle area of said auxiliary turbine can satisfactorily be less than when the auxiliary turbine is supplied with power gases in parallel with the main turbine. Thus, for instance, in a marine installation the ratio between the maximum and minimum cross-sections of an auxiliary turbine supplied with air derived from the compressed air reservoir from which the power cylinder is supplied may be equal to 7.5 (as opposed to 100 in the case of supply with power gases), the pressure in the reservoir containing the air for supplying the engine cylinder being equal to 4 kg./cm.² at full load, and to 0.8 kg./cm.² at no load, these values corresponding to the values 3.2 and 0.1 kg./cm.² at the exit from the power cylinder of the same gas-generator. In the case of an electricity-producing plant, the maximum and minimum pressures in the air reservoir are equal to 4 and 1.5 kg./cm.² respectively, so that the ratio between maximum and minimum effective nozzle areas of the auxiliary turbine becomes 3.6 as opposed to 5.5 when the auxiliary turbine is supplied with driving gases and is connected in parallel with the main turbine. Thus, the invention makes it possible to reduce considerably the dimensions of the auxiliary turbine and to make adjustment simpler, since the ratio of the effective nozzle areas of the auxiliary turbine for idle operation and full load operation, respectively, of the gas-generator is much less than when the auxiliary turbine is supplied with power gases and connected in parallel with the main turbine.

Diagrammatically illustrated in the single figure of the drawings is an installation comprising a free-piston gas-generator, delivering a stream of power gases which drive a main turbine and which is provided with an auxiliary turbine for driving a number of the auxiliaries of the gas-generator, the gas-generator and the said auxiliary turbine being arranged according to the present invention.

The gas-generator proper is formed in any desired manner, for example in the manner diagrammatically shown in the drawing. According to the drawing, the gas-generator comprises two coaxial cylinders, to wit cylinder 1, which is the power cylinder, and cylinder 2 the part 2a of which (near cylinder 1) is a compressor cylinder and the part 2b of which (remote from cylinder 1) is a return energy accumulator. A free piston having the form of a double piston operates in said two cylinders. Part 3 of the piston forms a power piston which co-operates with power cylinder 1, while part 4 of the piston operates in cylinder 2 and forms a compressor piston, an annular face of part 4 facing towards part 3 and being responsible for intake and compression of air in part 2a of cylinder 2, while the opposite face of part 4 co-operates with the air cushion enclosed in part 2b of cylinder 2.

Power cylinder 1 comprises an injector 5, inlet ports 6 and exhaust ports 7, said ports being controlled by piston 3.

The chamber 2a of cylinder 2 has one or more air inlet valves 8 and one or more delivery valves 9 through which compressed air is supplied to an air reservoir 10 which surrounds the power cylinder 1 and which forms a kind of casing therearound.

Air is drawn through valve 8 when piston 3, 4 is moving on its outward stroke as a result of combustion of fuel in cylinder 1, and is compressed and delivered to reservoir 10 when piston 3, 4 effects its return stroke as a result of the energy stored up in the energy accumulator 2b during the preceding stroke.

The exhaust ports 7 of power cylinder 1 are connected through piping 11 to a receiving engine such, for instance, as a main turbine 12 which is driven by the mixture of compressed air and incompletely-expanded combustion gases which issues through ports 7 during the periods that these are unmasked by piston 3.

For the sake of convenience, the drawing shows a gas-generator comprising only one double piston 3, 4 but in practice gas-generators generally comprise two opposed double pistons, the power parts 3 of which work in opposite directions in a single cylinder 1 and the compressor parts 4 of which work in two cylinders 2 disposed on either side of the power cylinder 1, the two opposed free pistons being interconnected in conventional manner by synchronising means.

To drive, for example, a pump which maintains a circulation of cooling water in the gas-generator and/or to drive a blower for cooling the cooling water, or to drive other auxiliary devices of the gas-generator, I make use of an auxiliary turbine. This turbine is driven, according to my invention, not by the power gases leaving power cylinder 1 through ports 7 but by compressed air derived from casing 10.

Since the power necessary to drive this auxiliary device or these auxiliary devices remains substantially constant or varies but slightly whatever the load on the gas-generator (said load corresponding to that on the main receiving engine 12) and since the air pressure in casing 10 varies substantially when the loading of the gas-generator varies, the auxiliary turbine has to be provided with means for varying the effective nozzle area thereof in inverse ratio to the air pressure in casing 10.

The auxiliary turbine illustrated in the drawing comprises a rotor 13 which has peripheral blading and which is fixed to a shaft 14. Admission to this turbine occurs over a number of sections 15a, 15b, etc. comprising, at their end near rotor 13, guide blading 16, each of the said sections being controlled at the entry end by valves designated 17a, 17b, etc. respectively. Each valve when open places the corresponding section in communication with a common inlet chamber 18 of toroidal form. Chamber 18 is connected through piping 19 to the casing 10 of the gas-generator.

Thus, the effective nozzle area of the auxiliary turbine can be increased or reduced by opening or closing different numbers of valves 17a, 17b, etc., successively.

To regulate the number of valves 17a, 17b, etc. open at a given moment, I make use of a centrifugal speed governor 20 which is driven through helical gears 21—22 from the shaft 14 of the auxiliary turbine and which, through the agency of a hydraulic or pneumatic servo-motor arrangement, moves a toothed rack 23 actuating a pinion 24 keyed to a shaft 25 to which is fitted a cam 26 acting upon the stems of the valves 17a, 17b, etc. The servo-motor arrangement comprises in conventional manner a distributor 27 controlling a working cylinder 28 in which can move a piston 29 conected to the toothed rack 23, the rods of distributor 27 and of piston 29 being connected to a lever 30 acted upon at one end by governor 20.

When the pressure of the air which drives the auxiliary turbine rises or drops, the governor 20 closes or open an appropriate number of valves 17a, 17b, etc. and correspondingly decreases or increases the effective cross-section of rotor 13, thus maintaining the speed thereof at a substantially constant value. The air, after having passed through the blading of rotor 13, escapes through an exhaust pipe 31 fixed to a cover 32 of the turbine.

Through the agency of a reducing gear comprising, for instance, toothed wheels 33a—33b, the shaft 14 drives one or more auxiliary devices of the gas-generator for instance a fan 44 and a pump 45.

Advantageously, in some cases, the air derived from casing 10 is heated before reaching the entry of the auxiliary turbine. This heating can be effected, for example, by means of a heat exchanger 34 which heats the air in an auxiliary reservoir 35 connected with piping 19. This heating can also be effected by burning some fuel in piping 19. Such a heating is advantageous when the gas generator is run to supply a high power and it is therefore necessary to increase the power supplied to the auxiliary turbine.

On the contrary, in other cases, the air derived from casing 10 is with advantage cooled before reaching the entry of the auxiliary turbine. This cooling can be effected in an auxiliary tank similar to the auxiliary tank 35 but having cooling means. A cooling of this kind provides, at the outlet of the auxiliary turbine (exhaust pipe 31), air of a temperature lower than ambient temperature. This air can be used, for example, to cool the driving cab of a locomotive.

According to another feature of my invention, and to take account of the fact that with the gas-generator lightly loaded the power required to drive the auxiliary device or devices may also be slightly reduced, the auxiliary turbine speed is so regulated as to be reduced when the gas-generator is operating at a reduced load. To this end, the tension of a spring 36 of the governor 20 can be made to vary in dependence upon a factor which varies with the loading of the gas-generator. A factor of this kind is, for example, the pressure in casing 10 or the pressure in the inlet chamber 18 of the auxiliary turbine. To regulate the tension of the spring 36 in dependence upon the latter pressure, I may use the arrangement illustrated in the drawings, where one end of spring 36 is fixed to a screw-threaded rod 37 having a pinion 38 with which a toothed rack 39 co-operates. The toothed rack 39 is connected to a piston 40 adapted to move inside a cylinder 41, one end of which is connected through piping 42 to the inlet chamber 18 of the auxiliary turbine, so that the pressure prevailing in chamber 18 acts upon one side of piston 40, while the other side of piston 40 is acted upon by a spring 43 located inside cylinder 41. In order to limit the regulating action of the device 37 to 43 to a range of pressures corresponding to reduced gas-generator loadings, an abutment may be provided inside cylinder 41 to stop piston 40 when the pressure in chamber 18 reaches a value corresponding to the upper limit of said range of pressures.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A gas generator which comprises, in combination, a power unit including a power cylinder and a power piston, an air compressor unit including a compressor cylinder and a compressor piston, the elements of said compressor unit being operatively connected with those of said power unit, respectively, whereby said air compressor unit is driven by said power unit, an air reservoir, passage means and valve means between the outlet of said compressor unit and said reservoir for feeding it with compressed air from said compressor unit, means operative by said power unit for directly connecting said reservoir with said power cylinder for predetermined portions of the cycle of operation of said power unit, a main gas operated receiver machine, means for directly connecting the outlet of said power cylinder with the inlet of said receiver machine, at least one auxiliary device for the operation of said gas generator, an air turbine for driving said auxiliary device, means for connecting said air reservoir with said air turbine to feed power fluid to said turbine, means responsive to variations of the pressure in said air reservoir, for automatically varying the effective nozzle area of said turbine in inverse ratio to the value of said pressure in said air reservoir, and means responsive to variations of the load of said generator for reducing the speed of said turbine when said load is reduced, at least for values of said load inside a range of low values thereof.

2. A gas generator which comprises, in combination, a power unit including a power cylinder and a power piston, an air compressor unit including a compressor cylinder and a compressor piston, the elements of said compressor unit being operatively connected with those of said power unit, respectively, whereby said air compressor unit is driven by said power unit, an air reservoir, passage means and valve means between the outlet of said compressor unit and said reservoir for feeding it with compressed air from said compressor unit, means operative by said power unit for directly connecting said reservoir with said power cylinder for predetermined portions of the cycle of operation of said power unit, a main gas operated receiver machine, means for connecting the outlet of said power cylinder with the inlet of said receiver machine, at least one auxiliary device for the operation of said gas generator, an air turbine for driving said auxiliary device, means for directly connecting said air reservoir with said air turbine to feed power fluid to said turbine means responsive to variations of the pressure in said air reservoir and comprising a centrifugal speed governor operatively connected with said turbine so as to be driven by it, for automatically varying the effective nozzle area of said turbine in inverse ratio to said pressure in said air reservoir, and means for controlling the operation of said speed governor in response to variation of the pressure in said reservoir so as to reduce the speed of said turbine when the load of said generator is reduced, at least for values of said load inside a range of low values thereof.

References Cited in the file of this patent

UNITED STATES PATENTS

| 832,592 | Bush | Oct. 9, 1906 |
| 1,269,492 | Nagelmann | June 11, 1918 |
| 1,813,543 | Pescara | July 7, 1931 |
| 2,115,921 | Steiner | May 3, 1938 |
| 2,371,889 | Hermitte | Mar. 20, 1945 |
| 2,612,020 | Griffith | Sept. 30, 1952 |

FOREIGN PATENTS

| 502,758 | Great Britain | Mar. 24, 1939 |